US012621667B2

(12) United States Patent
Tang et al.

(10) Patent No.: US 12,621,667 B2
(45) Date of Patent: May 5, 2026

(54) METHOD OF CAMERA CAPTURING SIGNAL CONTROLLED BY SECURITY GATEWAY

(71) Applicant: Syber Sense IP Holdings, LLC, Millcreek, UT (US)

(72) Inventors: Lap Tak Tang, Hong Kong (CN); Barrett Morgan, Millcreek, UT (US)

(73) Assignee: SYBER SENSE IP HOLDINGS, LLC, Millcreek, UT (US)

( * ) Notice: Subject to any disclaimer, the term of this patent is extended or adjusted under 35 U.S.C. 154(b) by 243 days.

(21) Appl. No.: 18/179,242

(22) Filed: Mar. 6, 2023

(65) Prior Publication Data

US 2023/0284022 A1 Sep. 7, 2023

Related U.S. Application Data

(60) Provisional application No. 63/316,640, filed on Mar. 4, 2022.

(51) Int. Cl.
| | |
|---|---|
| *H04W 12/08* | (2021.01) |
| *G06N 20/00* | (2019.01) |
| *G08B 29/18* | (2006.01) |
| *H04W 4/38* | (2018.01) |

(52) U.S. Cl.
CPC ............ *H04W 12/08* (2013.01); *G06N 20/00* (2019.01); *G08B 29/186* (2013.01)

(58) Field of Classification Search
CPC ........ H04W 12/08; H04W 4/38; G06N 20/00; G08B 29/186
See application file for complete search history.

(56) References Cited

U.S. PATENT DOCUMENTS

| | | | | |
|---|---|---|---|---|
| 11,633,103 B1 * | 4/2023 | Nudd | ...................... | G06F 17/18 |
| | | | | 704/9 |
| 2020/0005613 A1 * | 1/2020 | Yuan | ...................... | G06V 40/10 |
| 2020/0175847 A1 * | 6/2020 | Kumar Srivastava | ...................... | |
| | | | | G08B 29/186 |
| 2020/0349241 A1 * | 11/2020 | Shapiro | ................ | G06V 10/764 |
| 2021/0225146 A1 * | 7/2021 | Ghyme | ................ | G06V 20/52 |
| 2022/0068097 A1 * | 3/2022 | Picardi | .................. | G08B 31/00 |

* cited by examiner

*Primary Examiner* — Shirley X Zhang

(74) *Attorney, Agent, or Firm* — Kilpatrick Townsend & Stockton LLP

(57) ABSTRACT

Techniques for improving alarm event detection for security systems are described herein. For example, a security system can receive a first set of data associated with an event in an environment from a first detection device. The security system can instruct a second detection device to detect a second set of data for the environment based on the first set of data. The security system can determine an alarm status for the event based at least in part on a condition of the event output by an artificial intelligence model. The artificial intelligence model can output the condition responsive to receiving an input including the first set of data and the second set of data. The alarm status can include a false alarm event or an alarm event. The security system can output an alarm indicating the event based on determining that the alarm status is an alarm event.

20 Claims, 12 Drawing Sheets

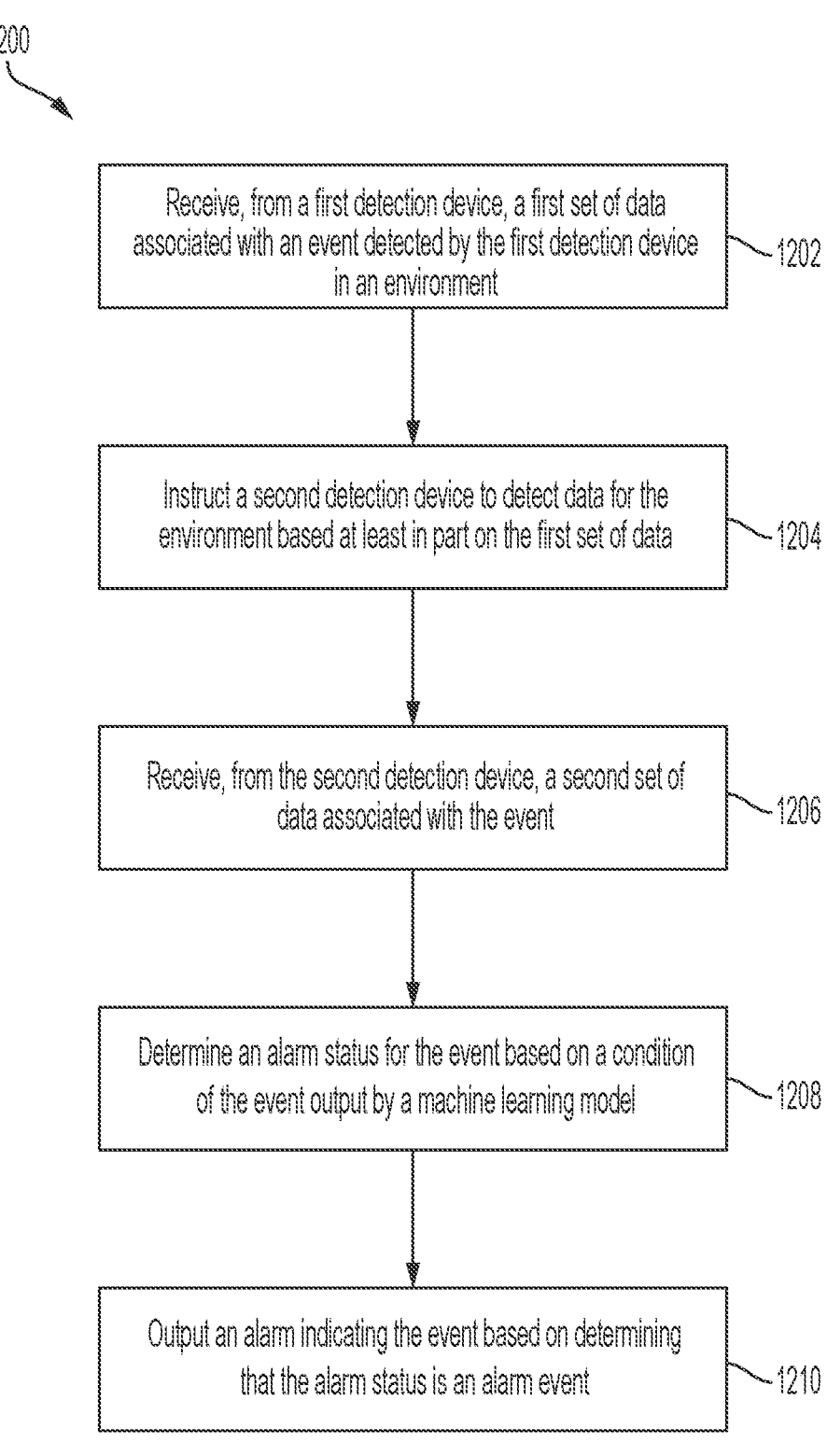

1200

Receive, from a first detection device, a first set of data associated with an event detected by the first detection device in an environment —1202

Instruct a second detection device to detect data for the environment based at least in part on the first set of data —1204

Receive, from the second detection device, a second set of data associated with the event —1206

Determine an alarm status for the event based on a condition of the event output by a machine learning model —1208

Output an alarm indicating the event based on determining that the alarm status is an alarm event —1210

FIG. 12

METHOD OF CAMERA CAPTURING SIGNAL CONTROLLED BY SECURITY GATEWAY

CROSS-REFERENCE TO RELATED APPLICATION

This claims the benefit of priority of U.S. Provisional Patent Application No. 63/316,640, titled "A Method Of Camera Capturing Signal Controlled By Security Gateway" and filed Mar. 4, 2022, the entirety of which is incorporated herein by reference.

BACKGROUND

Home security systems can include various devices for detecting objects and/or people. For example, home security systems can include cameras, motion sensors, and heat sensors. The devices can send a signal to a hub when a disturbance is detected. For example, when a person is detected in a house or a there is heat from a fire, the devices can signal the hub. The hub can trigger an alarm and/or alert authorities based on the signal received from the devices. However, the hub can trigger the alarm and/or alert authorities when there is no actual disturbance or when the disturbance is minor. This can result in users ignoring the alarms and not taking appropriate actions and/or authorities being slow to respond to alarms.

BRIEF DESCRIPTION OF THE DRAWINGS

Various embodiments in accordance with the present disclosure will be described with reference to the drawings, in which:

FIG. 12 is an example flow chart of a process for generating an alarm based on an event, according to embodiments of the present disclosure.

DETAILED DESCRIPTION

Figure 1:
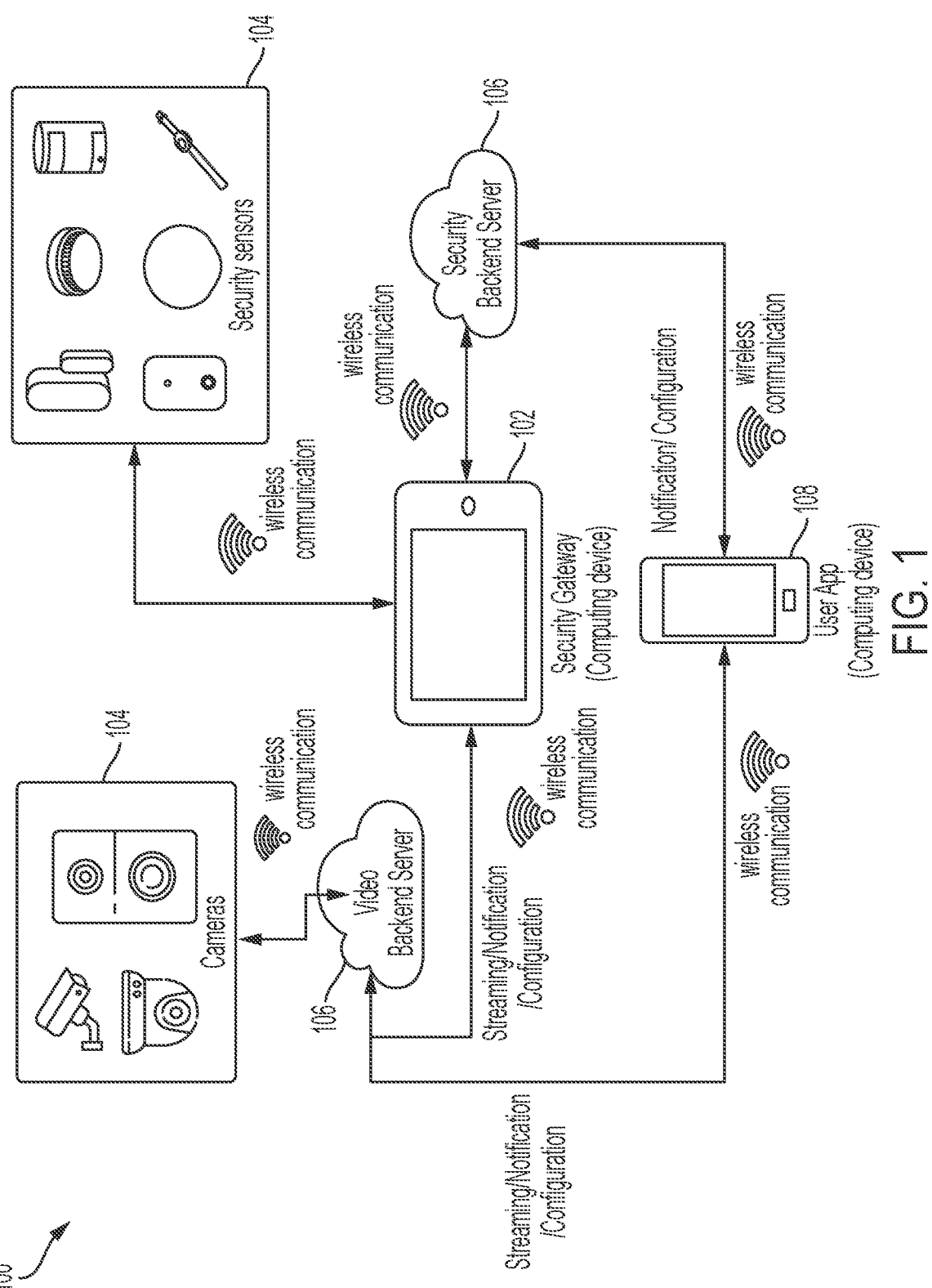
FIG. 1 illustrates an example home security system, according to embodiments of the present disclosure.

Home security systems can include various devices for detecting objects and/or people. For example, home security systems can include detection devices (e.g., cameras, motion sensors, and/or heat sensors). The detection devices can send a signal to a hub when a disturbance is detected. For example, when a person is detected in a house or a there is heat from a fire, the detection devices can send a detection signal to the hub.

In traditional home security systems, the various detection devices work independently to detect events and send detection signals to the hub. In these traditional systems, a detection device can send a detection signal to a hub. The hub can receive the signal and send an alert based on the one signal. However, because the hub sends the alert based off of a signal from one detection device, the hub can send alarms for minor disturbances that may not necessitate an alarm (e.g., false alarms). For example, a single smoke detector may send a detection signal to the hub that smoke has been detected and the hub can send a fire alarm (e.g., an alarm alerting the local authorities, a monitoring station, and/or homeowner that there is a fire). However, this smoke may be from burning food and/or candles and not from an actual fire. These false alarms can impact a user's confidence in their home security system and may cause the user and/or local authorities to ignore alarms and/or respond slowly to alarms, which could impact the user's safety.

Additionally, traditional home security systems may fail to fully capture the details of a detected event. For example, the system can include a detection device (e.g., a door sensor and/or a window sensor) that can detect that a window or door has been opened and/or a window has been broken. However, the detection devices that detect the event may not include a camera and would be unable to capture the identity of a potential intruder. Alternatively, the security system may include a camera separate from the door and/or window sensors. However, the activation of the door and/or window sensor may not the camera to activate and record the event.

An example home security system can include one or more detection devices that can communicate with a hub. The detection devices can capture (e.g., record) data associated with a building or dwelling. For example, the detection devices can capture video, photos, audio, motion, smoke, heat, gas, chemicals, and/or data from any suitable sensor and/or detection device. The detection devices and/or the hub can use artificial intelligence to detect data associated with a triggering event. For example, a detection device can detect that a triggering event has occurred and, based on the triggering event, the hub can collect data from other detection devices to determine, using artificial intelligence, if an alert should be sent to a user, the local authorities, and/or a monitoring station. Using artificial intelligence to determine validity of triggering events can reduce false alarms being reported to the user, the local authorities, and/or the monitoring station. In some examples, the artificial intelligence can include a model based on user behavior. The model can be used with an input from a detection device to determine if an alert should be sent. For example, the detection device may determine a triggering event, and data collected for that triggering event may be input into the model. The model may indicate that the triggering event is not unusual behavior for the user, and thus the triggering event may be a false alarm.

This application relates to a smart home security system that includes devices with one or more artificial intelligence models. The devices can be or include a hub (e.g., a security gateway) that can communicate with various detection devices (e.g., cameras, motion sensors, proximity sensors, a microphone, intercoms, door sensors, window sensors, smoke sensors, heat sensors, $CO_2$, doorbells, and/or any other suitable device or object configured to sense present conditions). The detection devices can capture (e.g., record) data associated with a building or dwelling. For example, the detection devices can capture video, photos, audio, motion, smoke, heat, gas, chemicals, and/or data from any suitable sensor and/or detection device.

The artificial intelligence models can be used to determine if a detected event should trigger an alarm. For example, a detection device can detect that an event has occurred. The detection device can send a signal to the hub. The signal can include data associated with the event. The hub can include artificial intelligence that can be used to analyze the data. Based on the analysis, the hub can communicate with other detection devices to obtain additional data associated with the event. Based on the additional data, the hub can determine whether an alarm should be sent to a user, a monitoring station, the local authorities, or not sent at all.

In various embodiments, the artificial intelligence models can be updatable. For example, the artificial intelligence models can be updated based on behavior of users associated with the hub. The artificial intelligence models can be customized for individual users and/or for individual dwellings or buildings. For example, the artificial intelligence models can be updated based on arrival and/or departure habits of the user. The updated models can be used by the hub to determine if an event should trigger an alarm (e.g., should be reported to the user, the monitoring station, and/or the local authorities).

Turning now to a particular example, a home security system can include a security gateway and one or more detection devices. A first detection device, such as a smoke alarm, can detect data associated with an event occurring in an environment such as a house. The data can may indicate the presence of smoke in a room. The data can be sent from the smoke alarm to the security gateway. The security gateway can instruct a second detection device such as a camera to detect data associated with the event or an associated event. For example, the camera may capture images for the room in which the smoke alarm is positioned. The data from the camera can be sent to the security gateway. The security gateway can use the data received from the smoke alarm and the camera to determine if the event (e.g., presence of smoke) is an alarm event or a false alarm. For example, artificial intelligence models can be used with the data to determine if the event is an alarm event or a false alarm. The security gateway can input the data from the smoke detector and the images captured by the camera into the artificial intelligence model. The artificial intelligence model can output a condition of the event. For example, the condition may indicate that the event is a false alarm and that the presence of smoke is due to a burning candle detected in the images captured by the camera. Or, the condition may indicate that the images depict an amount of smoke that is typical for the room. The security gateway can therefore forgo sending an alarm, even though the smoke alarm detected smoke. Alternatively, if the artificial intelligence model output a condition indicating that the event is not a false alarm, an alarm can be generated by the security gateway. The alarm can be sent to a user and/or a monitoring station depending on a severity of the event indicated by the condition.

Turning now to the figures, FIG. 1 illustrates an example home security system 100, according to embodiments of the present disclosure. The home security system 100 can include a security gateway 102 that can communicate with one or more detection devices 104. The detection devices 104 can be or include cameras, motion sensors, intercoms, security panels, a gas sensor, a heat sensor, a smoke sensor, and/or doorbells. The detection devices 104 can capture data (e.g., photos, video, motion, gas, heat, an input, and/or audio). The data can be associated with an event that is detected by the detection devices 104. The detection devices 104 can send a signal to the security gateway 102 that an event has been detected. For example, a smoke sensor can send a signal to the security gateway 102 that smoke has been detected. The signal can include data associated with the detected event. For example, the signal data can include the location of the detection device 104 and the data indicating the event, such as an image of an intruder captured by a camera or a presence of smoke detected by a smoke alarm.

The security gateway 102 can be or include a hub that is positioned in a dwelling (e.g., a house or dwelling of a user). The security gateway can communicate with the detection devices 104 and/or one or more servers 106 (e.g., via wired and/or wireless communication). In some embodiments, the security gateway 102 can include one or more detection devices 104. For example, the security gateway 102 can include a camera, a microphone, and/or a proximity sensor.

In various embodiments, the security gateway 102 can include artificial intelligence models. The artificial intelligence models can be used to analyze the data received from the detection devices 104. For example, the artificial intelligence models can be used to analyze the data received from the detection devices 104 to determine the type of event that has occurred. Based on the data received from the detection devices 104 and/or the determined event, the security gateway 102 can communicate with another of the detection devices 104. For example, the security gateway 102 can communicate with another of the detection devices 104 to capture additional and/or alternative data associated with the determined event. The artificial intelligence models can be used with the additional and/or alternative data to determine if an alarm should be sent to a user (e.g., a user device 108), authorities, and/or a monitoring station. The alarm can include the type of event and/or data associated with the event. For example, the alarm can include audio, video, and/or a picture of the event and/or the environment in which the event occurred.

In some embodiments, the detection devices 104 can include an artificial intelligence model. The artificial intelligence model can be used to determine the type of event that has occurred and/or can be used to determine if an event is an alarm event. For example, the detection device 104 can detect data associate with an event (e.g., audio, visual, and/or chemical data). The artificial intelligence model can be used to analyze the data to characterize the type of event. For example, the data can be input into the artificial intelligence model, and the artificial intelligence model can output a probability that an event has reached a threshold for an alarm event. Based on the characterization output by the artificial intelligence model, the detection device 104 can send an alert to the security gateway 102 indicating that an event has occurred. The alert may include the data associated with the event.

As an illustrative example, the detection device 104 can detect that there is smoke (e.g., based on audio, visual, and/or chemical data detected by the detection device 104). The artificial intelligence models can be used by the detection device 104 or the security gateway 102 to determine an alarm status for the event. For example, the alarm status may characterize the smoke as an alarm event (e.g., smoke from a fire) or a non-alarm event (e.g., smoke from cooking). The the location of the detection device 104 (e.g., is the detection device 104 positioned in a cooking location) and/or the data detected by the detection device 104 (e.g., smoke is detected but no increase in temperature) can be inputted into the artificial intelligence model to output a condition used to determine the alarm status. The condition can indicate that there is a likelihood that a fire has occurred (e.g., the smoke is detected outside the kitchen and/or there is an increase in temperature), that there is a likelihood that no fire has occurred (the smoke is detected in the kitchen and/or there is no significant increase in temperature), and/or further data is needed to make a determination (e.g., further data from one or more detection devices 104). Based on the likelihood, the detection device 104 can send a signal to the security gateway 102 that an alarm event has occurred (e.g., there is high likelihood of a fire), that no alarm has occurred (e.g., that there is a high likelihood of no fire), and/or further data is needed (e.g., further data is needed from one or more additional detection devices 104). Based on the signal and/or the data received from the detection device 104, the security gateway 102 can send an alert an alarm event has occurred. In various embodiments, sending the alert can include using artificial intelligence models to confirm the determination of the artificial intelligence models in the detection device 104 and/or use data associated with the detection devices 104 to determine the alarm status.

In further embodiments, the artificial intelligence models used in the detection devices 104 and/or the security gateway 102 can be updated. For example, the artificial intelligence models can be updated based on data captured by the detection devices 104. The artificial intelligence models can be updated and customized for an individual user (e.g., for a building and/or dwelling). The customized artificial intelligence models can improve the identification of events that may be detected. For example, the artificial intelligence models can be updated based on user behavior such as entering and/or exiting a building or dwelling. Updating the artificial intelligence models may include retraining the models using the data obtained by the home security system 100. In some embodiments, this may include retraining without relying upon other data obtained from a backend server 106. In this manner, the artificial intelligence models may be tailored or otherwise customized to the behavior of users at the location at which the home security system 100 is deployed.

The detection devices 104 can communicate with the security gateway 102 using a wired and/or a wireless connection. For example, the detection devices 104 can communicate with the security gateway 102 via a Bluetooth connection, WIFI connection, and/or an Edge connection. The security gateway 102 can communicate with a user device 108 via a network connection 112. For example, the security gateway 102 can communicate with the user device 108 via an internet connection. The security gateway 102 can send an alarm to the user device 108. The alarm can include the event that has occurred and/or data associated with the event. For example, the alarm can include the event and audio and/or video data of the event.

Figure 2:
FIG. 2 illustrates an example communication diagram for a home security system, according to embodiments of the present disclosure.

In various embodiments, such as the communication diagram for the home security system 100 depicted in FIG. 2, the detection devices 104 and/or the security gateway 102 can communicate with one or more servers 106. The one or more servers 106 can receive data from the detection devices 104 and/or the security gateway 102. For example, the one or more servers 106 can receive data associated with an event and captured by the detection devices 104. As an illustrative example, the security gateway 102 can send audio and video data detected by camera detection devices to a video backend server and sensor data to a security sensor backend server when the security gateway 102 detects that tampering to the security gateway 102 and/or the detection devices 104 has occurred.

The home security system 100 can communicate (e.g., send data and/or alarms) to user(s) 202 (e.g., via a user device 108) and/or a monitor station 204. For example, the security gateway 102 can send an alert to a user device 108 and/or the monitor station 204. The home security system 100 can send data associated with the event to the monitor station 204 via the servers 106. For example, the home security system 100 can send audio, video, and/or sensor readings to the monitor station 204. In other examples, such as when tampering to the security gateway 102 and/or the detection devices 104 has occurred, the servers 106 can send audio, video, and/or sensor readings to the monitor station 204. The monitor station 204 can be or include a private monitoring station and/or emergency personnel.

Figure 3:
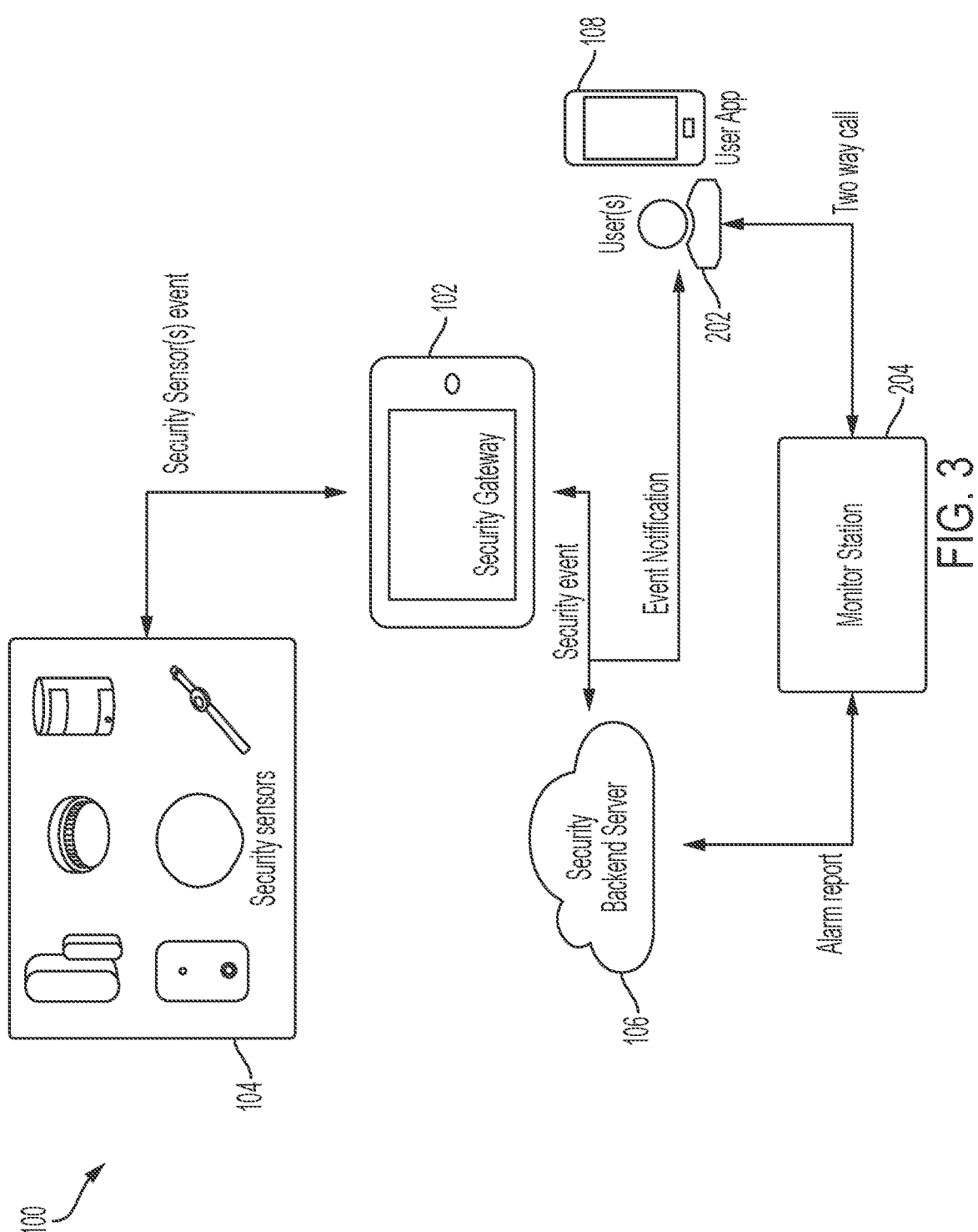
FIG. 3 shows an example data flow for a home security system, according to embodiments of the present disclosure.

Turning to FIG. 3, an example data flow for a home security system 100 is shown. One or more detection devices 104 can detect that an event has occurred. The detection devices 104 can capture data associated with the event. The detection devices 104 can send an alert that an event has been detected and/or the data associated with the event to the security gateway 102.

The security gateway 102 and/or the detection devices 104 can include artificial intelligence models that can be used to determine that an event that has occurred. For example, the security gateway 102 can include artificial intelligence models that can be used to determine that an event has occurred based on the data received from the detection devices 104. In some examples, the detection devices 104 can also include artificial intelligence models that can be used to determine that an event has occurred. The determination of the event and/or the event data captured by the detection devices 104 can be sent to the security gateway 102.

The data associated with the event (e.g., the data detected by the detection devices 104) can be sent to a server. For example, the security gateway 102 can send the data associated with the event to a security backend server 106. However, in some examples, the detection devices 104 can communicate directly with the server 106 to send the data associated with the event to the server.

In various embodiments, the security gateway 102 can send an alarm based on the event. The alarm can include the type of event that has occurred and/or data associated with the event (e.g., data detected by the detection devices 104). The alarm can be sent to a user(s) (e.g., via a user device 108) and/or to a monitoring station 204. In various embodiments, the alarm can include a prompt that can allow a user to interact with the home security system 100. For example, the alarm can allow a user to access the data associated with the event.

In some embodiments, the monitoring station 204 can communicate with the user(s) (e.g., via the user device 108). For example, the monitoring station 204 can create an audio link between the user(s) and the monitoring station 204. The monitoring station 204 can additionally or alternatively access the data associated with the event that has been uploaded to the servers 106.

Figure 4:
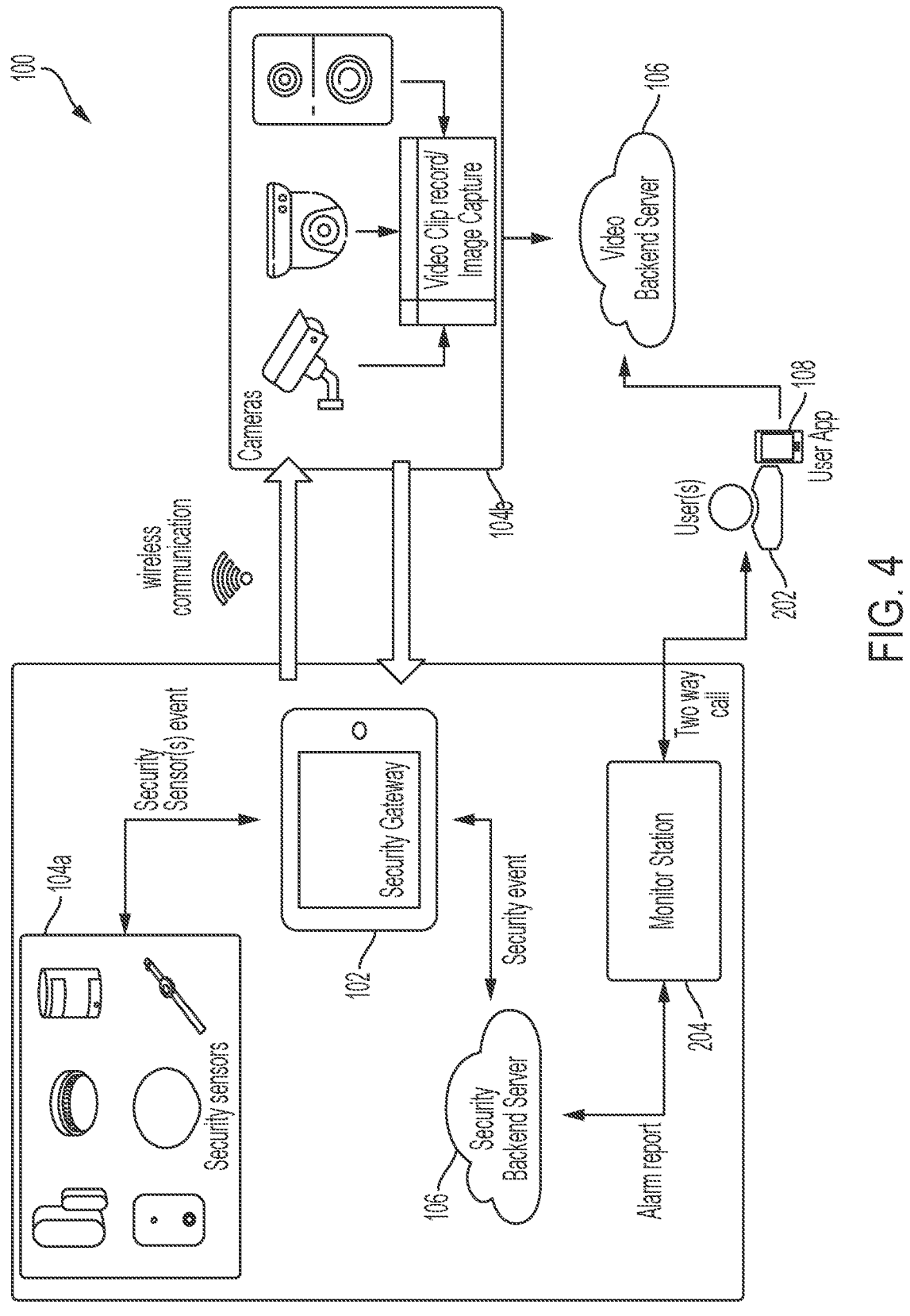
FIG. 4 shows another example data flow for the home security system, according to embodiments of the present disclosure.

In some embodiments, for example as shown in FIG. 4, the security gateway 102 can communicate with another detection device 104 to receive additional and/or alternative data associated with the event. For example, the security gateway 102 can receive a first set of data from a first detection device 104a, such as a window sensor, indicating that an event such as a break in may have occurred. The security gateway 102 can determine that the first set of data is inconclusive. For example, the security gateway 102 may input the first set of data into an artificial intelligence model, which can generate an output indicating that further information is needed to assess the event. Therefore, the security gateway 102 can instruct a second detection device 104*b*, such as a camera, to detect data for the environment (e.g., record video or images of the area near the window sensor). The security gateway 102 may instruct the second detection device 104*b* to detect data by sending an event notification to the second detection device 104*b*. The second detection device 104*b* can detect a second set of data and transmit the second set of data to the security gateway 102. The security gateway 102 can use both the first set of data and the second set of data to determine an alarm status for the event (e.g., whether the event is a false alarm event or an alarm event). Additionally, the security gateway 102 can output an alarm to the monitor station 204 and/or the user 202.

Figure 5:
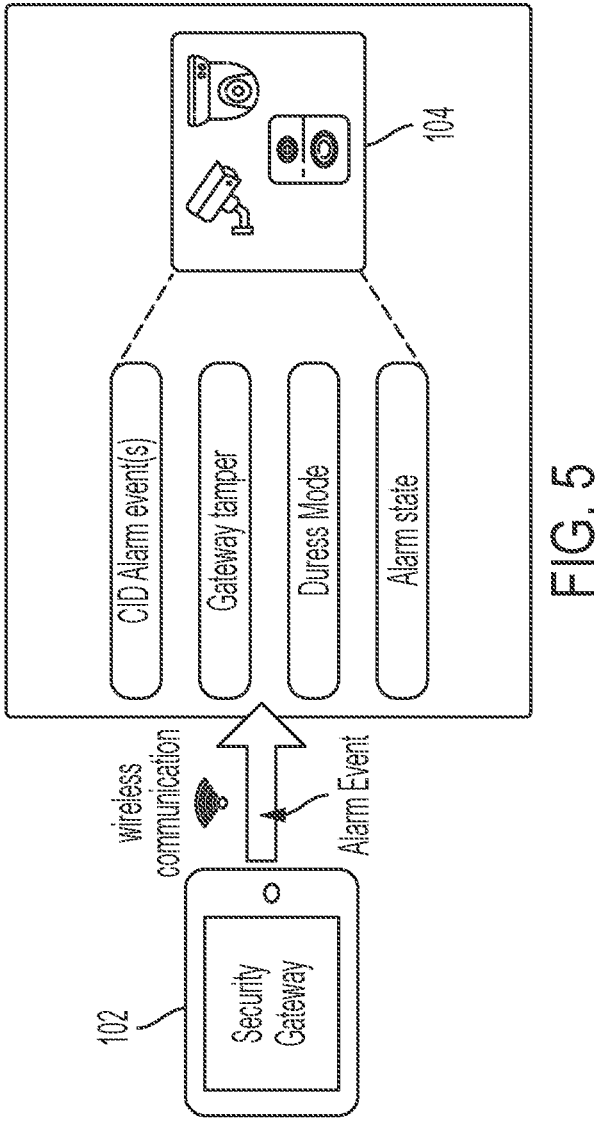
FIG. 5 illustrates an example detection device receiving an event notification from a security gateway, according to embodiments of the present disclosure.

Turning to FIG. 5, example detection device 104 receiving an event notification from the security gateway 102 is shown. In the example depicted in FIG. 5, the detection device 104 can be or can include a camera. The detection device 104 can receive various signals (e.g., events and/or data) from the security gateway 102. In some embodiments, the signals can be or include an operating state of the security gateway 102. The signals can be or include a CID alarm, a gateway tamper alarm, a duress mode signal, and/or an alarm state signal. The detection device 104 can receive the signal from the security gateway 102 and perform one or more actions based on the signal. For example, the detection device 104 can receive a signal from the security gateway 102 that an event is occurring. The detection device 104 can capture audio, video, and/or images associated with the event. The audio and/or video captured by the detection device 104 can be sent to a server. In some embodiments, the detection device 104 can include an indicator (e.g., a light and/or a speaker) that can be activated. For example, the indicator of the detection device can be activated when a signal has been received from the security gateway 102 that an event has been detected.

In further embodiments, the detection device 104 can include multiple operating states. The multiple operating states can be or include the same or similar operating states as the security gateway 102. The operating states can additionally or alternatively be or include an arm state, an arm stay, an arm away, and/or a disarm state. The operating state of the detection device 104 can change in response to the signal from the security gateway 102. For example, the operating state of the detection device 104 can change to be the same or similar to the operating state of the security gateway 102 in response to a signal from the security gateway 102 that the operating state of the security gateway 102 has changed.

Figure 6:
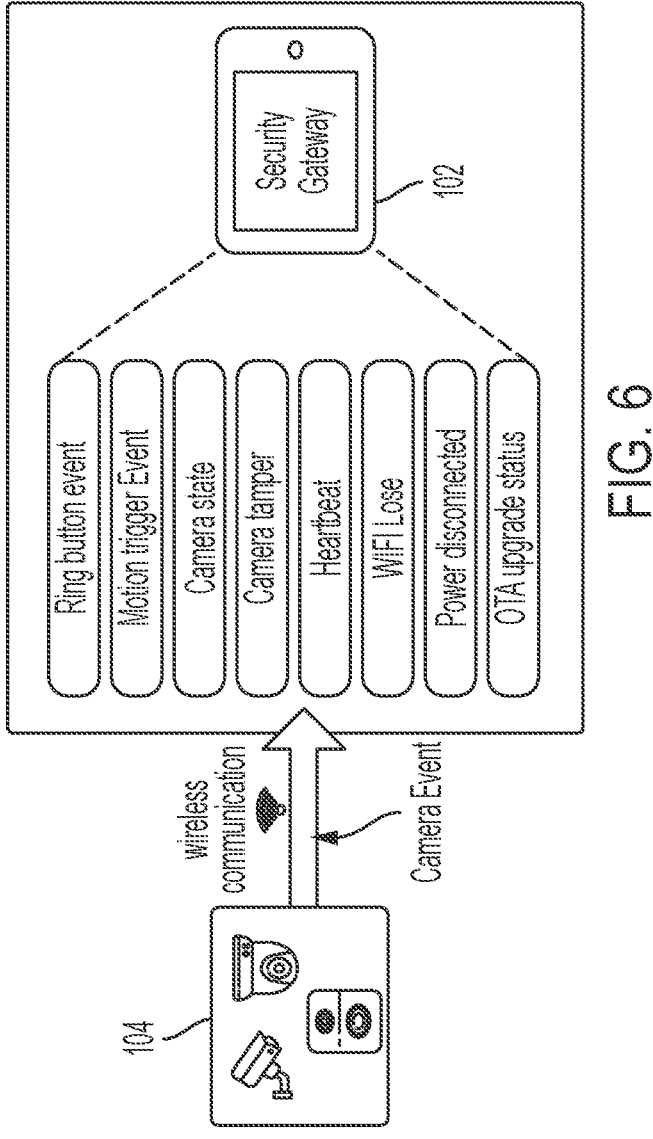
FIG. 6 illustrates an example security gateway receiving a signal from a detection device, according to some embodiments of the present disclosure.

FIG. 6 illustrates an example security gateway 102 receiving a signal from a detection device 104, according to embodiments of the present disclosure. The signal can be or include an event, data associated with an event, and/or an operating state of detection device 104. The signal can additionally or alternatively include a ring button event, a motion trigger event, a camera state, a camera tamper, a heartbeat, a WIFI loss, a power disconnect, and/or an over-the-air upgrade status. The security gateway 102 can receive the signal and perform one or more actions. For example, the security gateway 102 can change an operating state based on the signal. The security gateway 102 can change the operating state to be the same or similar to the operating state of the detection device.

In various embodiments, the security gateway 102 can include an indicator. The indicator can be activated, for example, when the signal has been received from the detection device 104. The indicator can be or include a light and/or a speaker.

Figure 7:
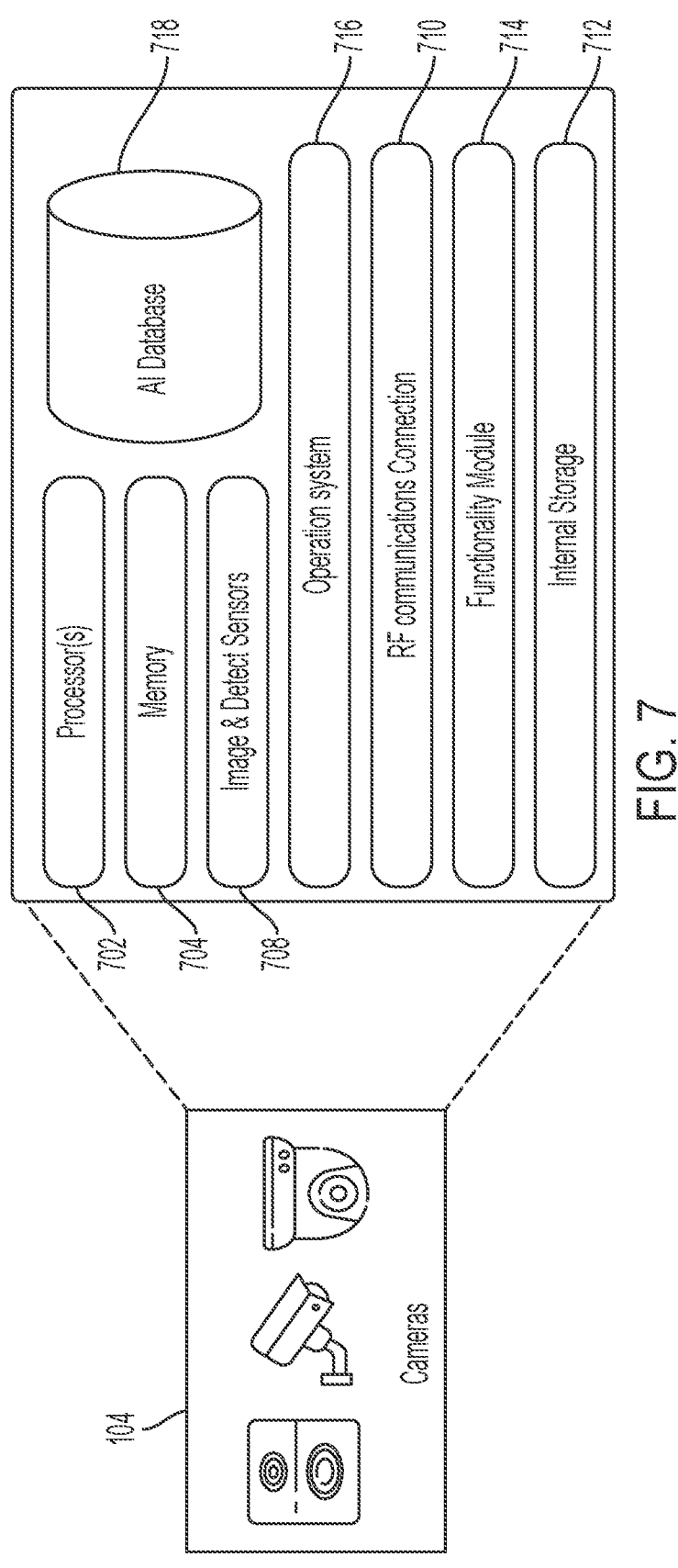
FIG. 7 illustrates an example detection device, according to embodiments of the present disclosure.

Turning to FIG. 7, components of an example detection device 104 are shown. The detection device 104 can include one or more of a processor 702, memory 704, and detector sensors 708. The processor 702 can implement the appropriate feature in hardware, firmware, and combinations thereof, such as those stored in the memory 704. The detection device 104 can also include an RF communication connection device 710 which can be used to communicate with a wireless router, a user device, a server, and/or other computer devices. Internal storage 712 can contain an artificial intelligence models database that has been trained in the advanced computer device or cloud. The functionality module 714 can include a motion detector algorithm, which can be used to detect events.

In various embodiments, the detection device 104 can include an operation system 716. The operation system 716 can manage the processor 702, the memory 704, the hardware, and/or the firmware. For example, the operation system 716 can schedule various tasks and/or allocate processing power for different tasks. The motion detection device 104 can additionally or alternatively include an AI database 718. The AI database 718 can be or include the artificial intelligence models. For example, the AI database 718 can be or include the artificial intelligence models that can be used to identify events and/or false alarms. The AI database 718 can be updatable. For example, the AI database 718 can be updatable based on events for individual users.

The AI database 718 can utilize deep learning architecture to train the artificial intelligence models. The deep learning architecture can generate training models related to specific tasks from large-scale data and make them suitable for specific applications. The deep learning architecture can generate training models for the artificial intelligence models in the detection devices 104. For example, the deep learning architecture can generate training models that can be used to train the detection devices 104 to detect events and/or determine the type of event. The training models can be used for iterative training of the deep learning architecture which can increase the accuracy of the identification of types of events and/or whether events are an alarm event or a false alarm.

Figure 8:
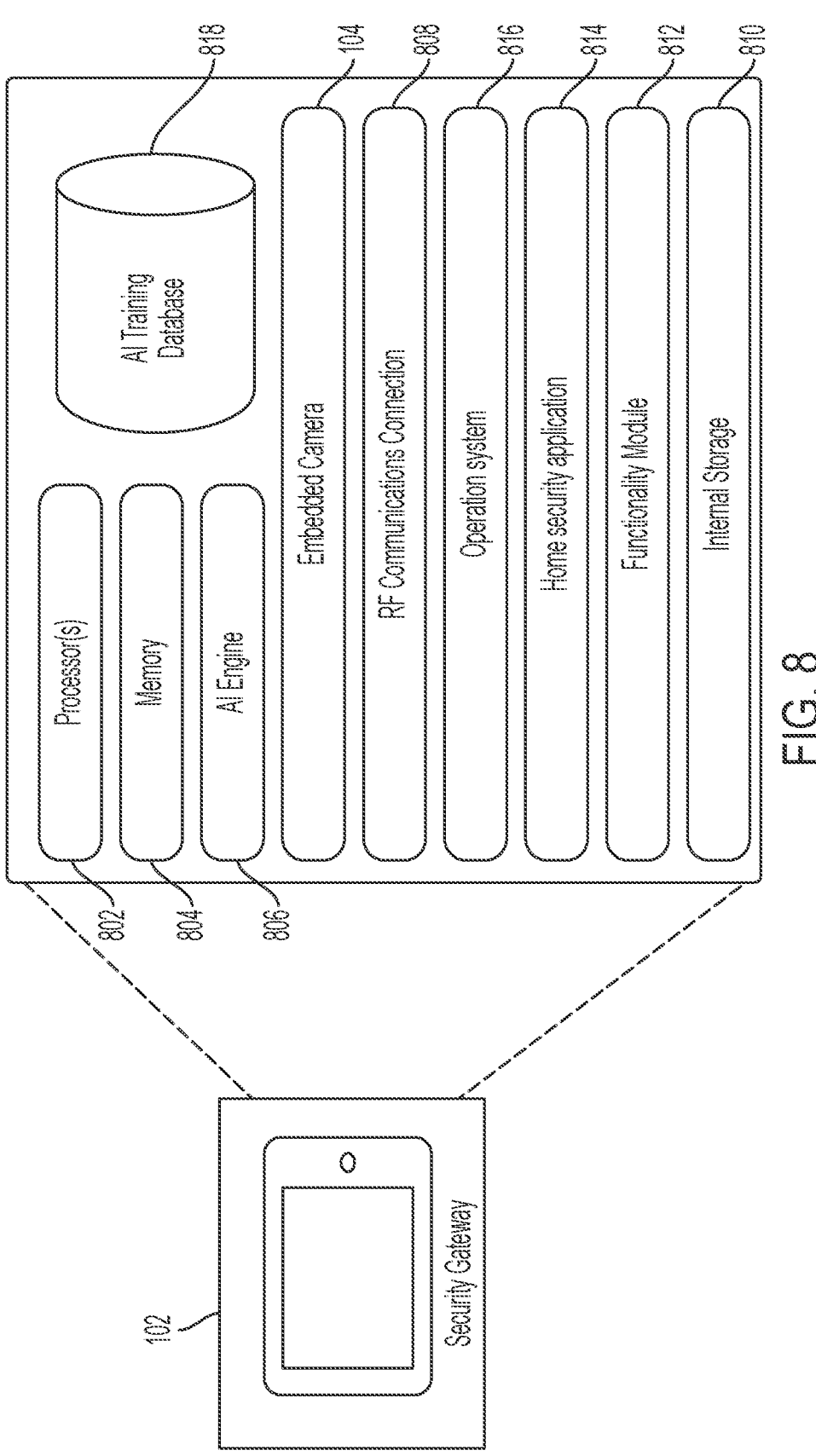
FIG. 8 illustrates an example security gateway, according to embodiments of the present disclosure.

Turning to FIG. 8, an example security gateway 102 is shown. The security gateway 102 can include a processor 802, memory 804, and an artificial intelligence engine 806. The processor can implement the appropriate feature in hardware, firmware, and combinations thereof, such as those stored in the memory 804. The security gateway 102 can also include an RF communications connection device 808 to communicate with a wireless router, a modem, a server, and/or detection devices 104. The security gateway 102 can execute the event determination and/or the evaluation of the event status as an alarm event or a false alarm event. Internal storage 810 can contain an artificial intelligence database that has been retained in the security gateway 102. The functionality module 812 may include system application protocols for the data associated with the false alarms. The home security application 814 can execute an alarm process and collect data associated with a false alarm event. The data associated with the false alarm event can be used to update the artificial intelligence models, for example, to customize the home security system 100 for an individual user.

The security gateway 102 can additionally or alternatively include an AI training database 818. The AI training database 818 can be the same as or similar to the AI database 718. The AI training database 818 which can be used to update the artificial intelligence models. For example, the AI training database 818 can use the data associated with the false alarm events to update the artificial intelligence models. The artificial intelligence models can be updated to reduce false alarms for individual users.

Figure 9:
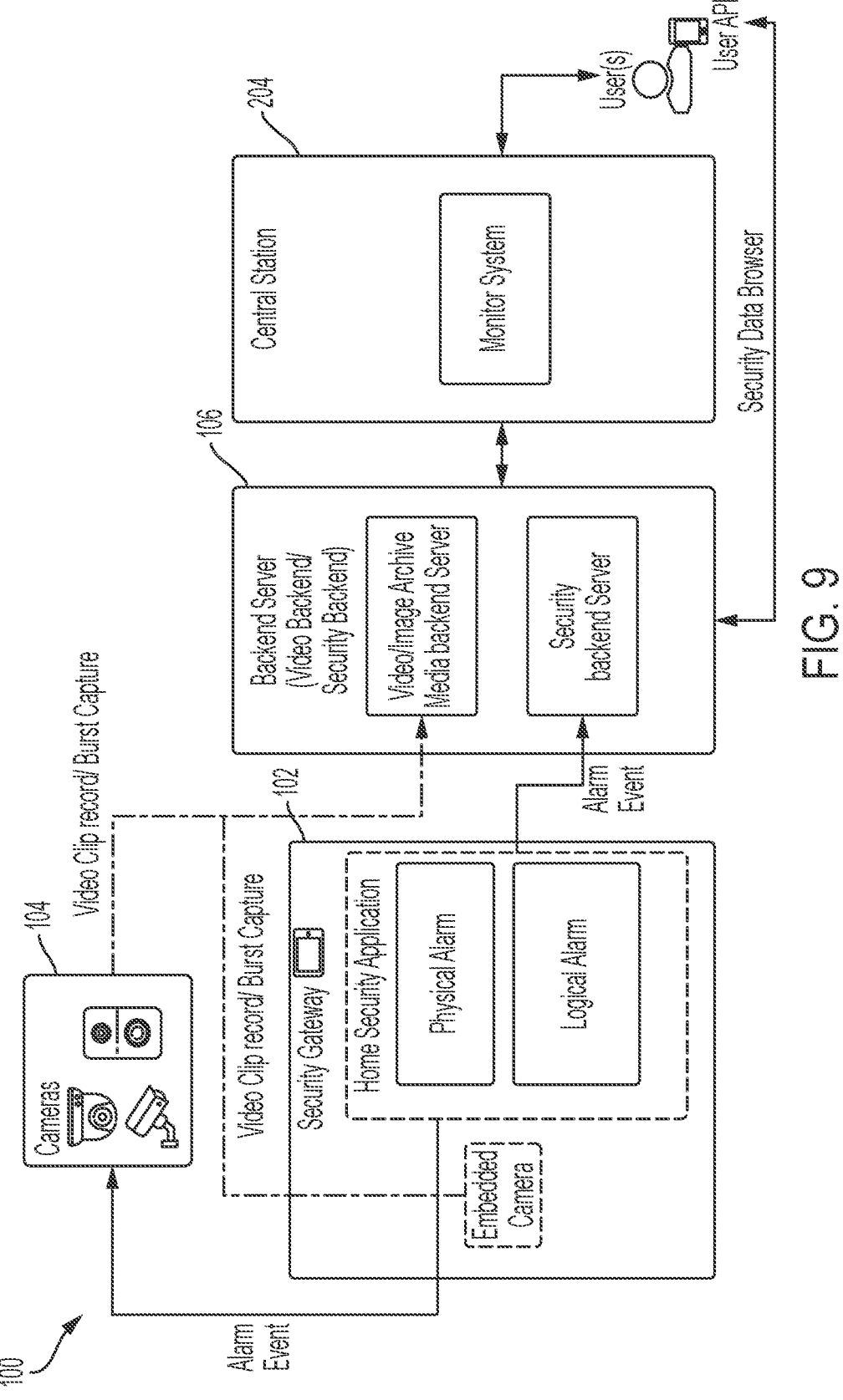
FIG. 9 illustrates an example process after a detection device receives a signal from a security gateway, according to embodiments of the present disclosure.

FIG. 9 illustrates an example process after receiving a signal (e.g., a signal including an event and/or data associated with an event) from the security gateway 102, according to embodiments of the present disclosure. The security gateway 102 can send a signal to the detection devices 104. For example, the security gateway 102 can send a signal that a physical alarm (e.g., a tamper alarm, a gyro-sensor alarm, and/or a proximity alarm) has been activated and/or a logical alarm (e.g., a security sensor alarm, a duress mode alarm, a gas/smoke sensor alarm, a glass broken alarm, a CID/Emergency event alarm) has been activated.

The detection devices 104 can receive the signal from the security gateway 102 record data (e.g., data associated with an event and/or the alarm). In some embodiments, one or more detection devices 104 included in the security gateway 102 (e.g., a camera and/or a microphone) can additionally or alternatively record the data.

The security gateway 102 and/or the detection devices 104 can communicate with one or more servers 106. For example, the detection devices 104 can send the recorded data to a server (e.g., a video/image archive server) and/or the security gateway 102 can send a notification of the event to a server (e.g., a security backend server).

The servers 106 can be accessed by a monitoring station and/or user(s) (e.g., via a user device 108). The monitoring station and/or the user(s) can access the event and/or the recorded data associated with the event. For example, the user(s) and/or the monitoring station can access video and/or audio recordings of the event.

Figure 10:
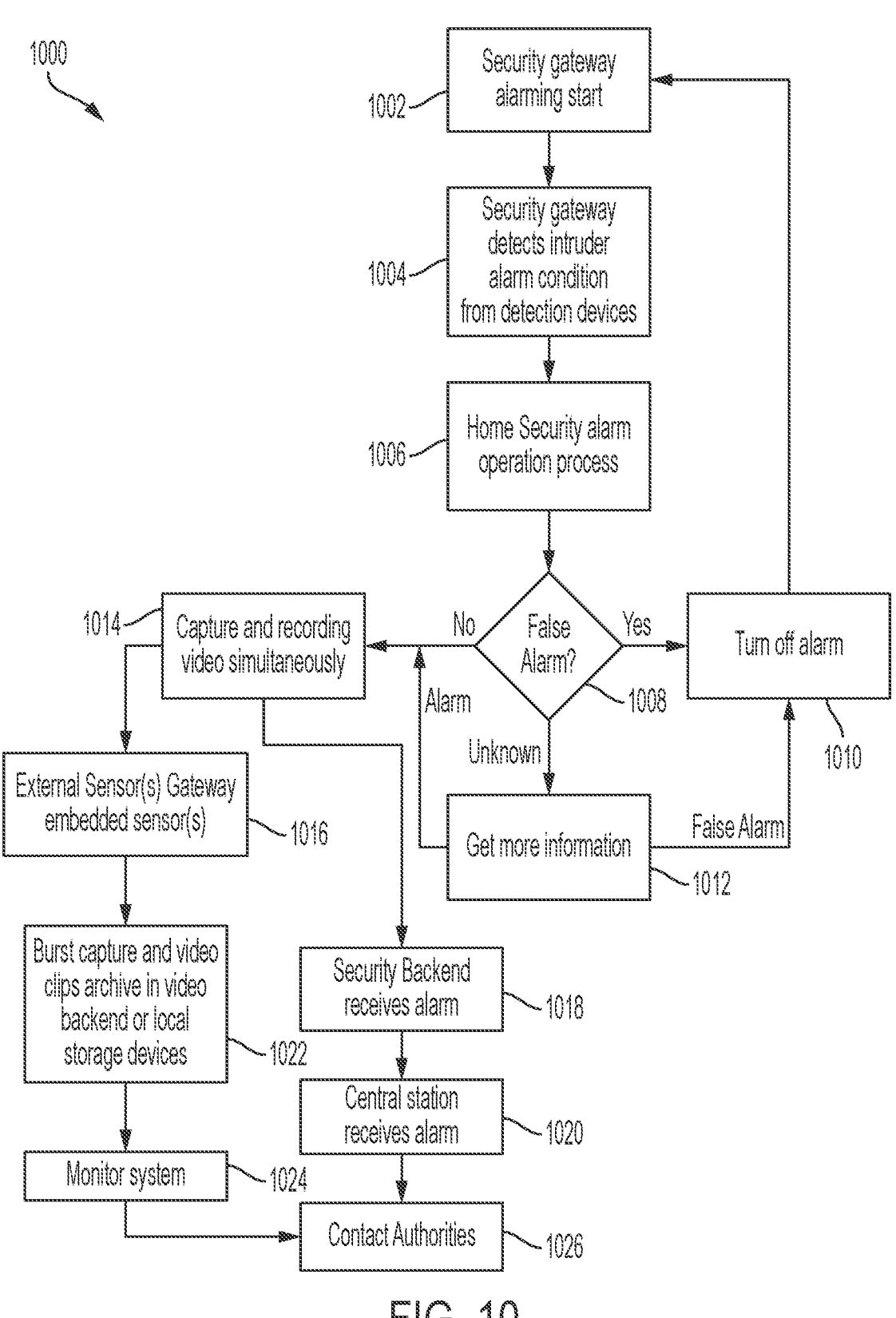
FIG. 10 is an example flow chart of an alarm process, according to embodiments of the present disclosure.

FIG. 10 is an example flow chart of an alarm process 1000, according to embodiments of the present disclosure. The process 1000 at block 1002 can include a security gateway (e.g., security gateway 102) being in an armed operating mode. In the armed operating mode, the security gateway 102 can receive event signals from one or more detection devices (e.g., detection devices 104) and/or can send an alert signal to a monitoring station and/or a user.

The process 1000 at block 1004 can include the security gateway 102 detecting an intruder alarm condition from detection devices 104. The detection devices 104 can detect that an event has occurred and can transmit data associated with the event to the security gateway 102. The security gateway 102 can input the data into an artificial intelligence model to determine the type of event based on a condition output from the artificial intelligence models. For example, the condition may indicate an intruder type of event, based motion data detected by a sensor in a room and sensor data from a door sensor for a door in the room that indicates the door has not been opened. The security gateway 102 can determine an alarm status based on the likelihood.

The process 1000 at block 1006 can include the home security alarm operation process. For example, the security gateway 102 may trigger an alarm system for a user associated with the room.

The process 1000 at block 1008 can include determining if the event is an alarm event or a false alarm For example, the security gateway 102 or the detection devices 104 may input the data collected by the detection devices 104 into an artificial intelligence model. The artificial intelligence model can analyze the data to determine if the event is an alarm event or a false alarm, and can output a condition indicating the event status. If the event status indicates a false alarm, the process 1000 at block 1010 can include turning off the alarm and changing the operating mode of the detection devices 104 and/or the security gateway 102 to a monitoring operation mode.

If the output from the artificial intelligence indicates that more information is needed to determine if the alarm is a false alarm (e.g., if it is unknown if the event is an alarm event or a false alarm), the process 1000 at block 1012 can include getting more information. Getting more information can include detecting additional data associated with the event using one or more detection devices 104. For example, the security gateway 102 can communicate with one or more detection devices 104 to instruct the detection devices 104 to detect additional data associated with the event. The additional information can be used to determine if the event is an alarm event or a false alarm. For example, the additional data can be input into the artificial intelligence model in the security gateway 102 output the event status for the event (e.g., whether the event is an alarm event or a false alarm event).

If the alarm is not a false alarm event, the process 1000 at block 1014 can include capturing and recording video simultaneously. The video can be captured and recorded using one or more detection devices 104 (e.g., one or more cameras) and/or the security gateway 102 (e.g., via one or more detection devices 104 integrated with and/or mounted to the security gateway 102). The video can be captured and recorded using detection devices 104 that are separate from the security gateway 102 and/or detection devices 104 that are integrated into (e.g., part of) the security. In various embodiments, the process 1000 at block 1016 can include capturing and/or recording data using detection devices 104 (e.g., external sensor(s) and/or embedded sensor(s) in the security gateway 102).

The process 1000 at block 1018 can include transmitting the captured data to one or more servers 106.

The process 1000 at block 1020 can include sending the event alarm to a central station (e.g., a monitoring station 204). The monitoring station can receive the alarm and/or the data associated with the event.

The process 1000 at block 1022 can include sending the captured data to a storage device. The storage device can be a local storage device (e.g., internal storage 712 or internal storage 810) and/or one or more servers 106.

The process 1024 can include monitoring the system. In various embodiments, monitoring the system can be or include the monitoring station 204. For example, similar to block 1020, monitoring the system can include receiving an event alarm and/or data associated with the event at a monitoring station 204.

The process 1026 can include contacting the authorities. The authorities can be contacted by the monitoring station, the security gateway 102, and/or the detection devices 104.

Figure 11:
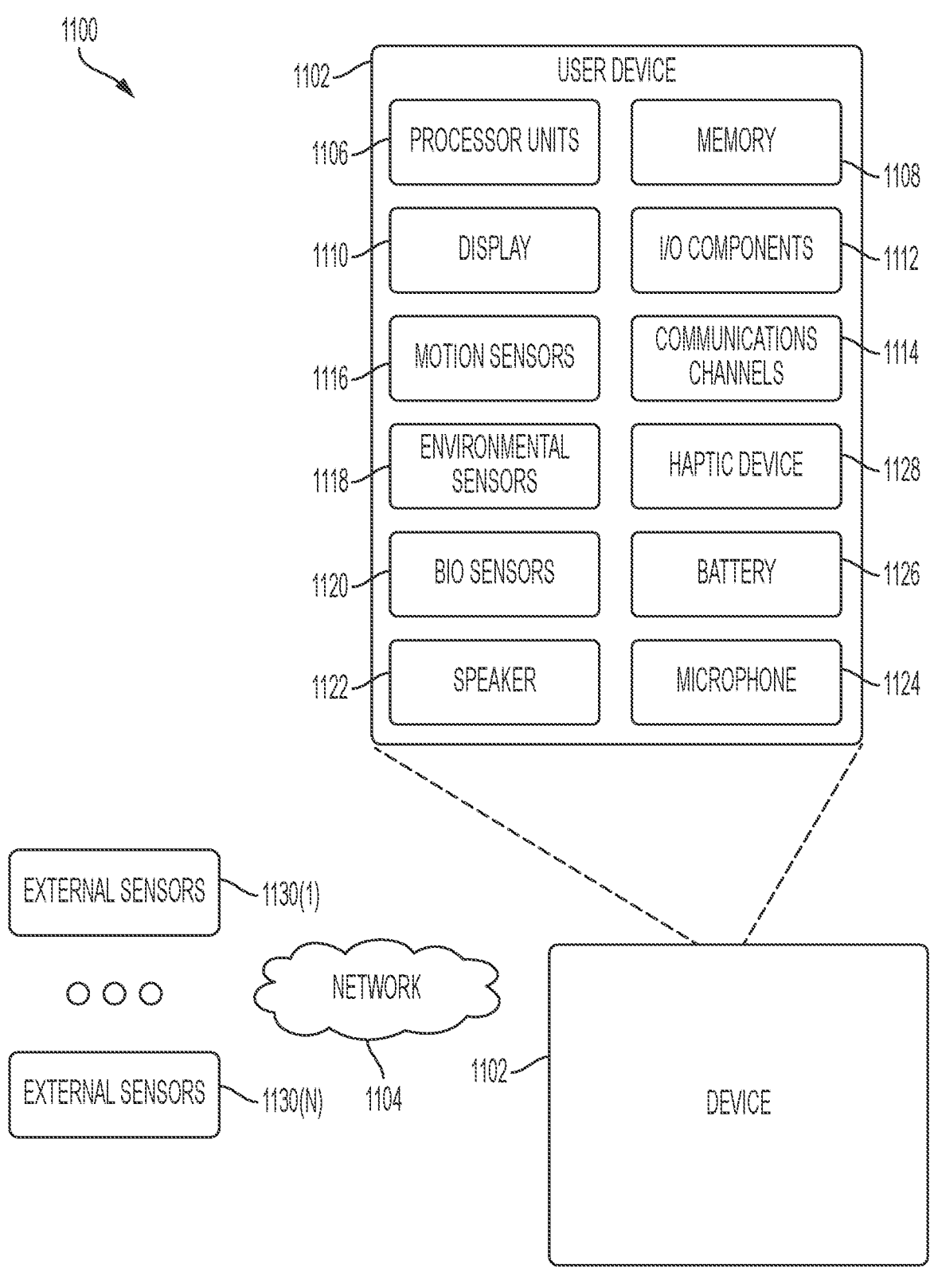
FIG. 11 illustrates a block diagram of an example security system, according to embodiments of the present disclosure.

FIG. 11 illustrates a block diagram of a security system 1100, according to embodiments of the present disclosure. The security system 1100 can be or include the home security system 100. The security system 1100 can include a device 1102, which can be or include a security gateway 102 and/or a detection device 104, that may communicate with various other devices and systems via one or more networks 1104.

As shown in FIG. 11, the device 1102 (e.g., the security gateway 102 and/or the detection device 104) includes one or more processor units 1106 that are configured to access a memory 1108 having instructions stored thereon. The processor units 1106 of FIG. 11 may be implemented as any electronic device capable of processing, receiving, or transmitting data or instructions. For example, the processor units 1106 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory 1108 may include removable and/or non-removable elements, both of which are examples of non-transitory computer-readable storage media. For example, non-transitory computer-readable storage media may include volatile or non-volatile, removable or non-removable media implemented in any method or technology for storage of information such as computer-readable instructions, data structures, program modules, or other data. The memory 1108 is an example of non-transitory computer storage media. Additional types of computer storage media that may be present in the device 1102 may include, but are not limited to, phase-change RAM (PRAM), static random-access memory (SRAM), dynamic random-access memory (DRAM), random-access memory (RAM), read-only memory (ROM), electrically erasable programmable read-only memory (EEPROM), flash memory or other memory technology, compact disc read-only memory (CD-ROM), digital video disc (DVD) or other optical storage, magnetic cassettes, magnetic tape, magnetic disk storage or other magnetic storage devices, or any other medium that can be used to store the desired information and that can be accessed by the device 1102. Combinations of any of the above should also be included within the scope of non-transitory computer-readable storage media. Alternatively, computer-readable communication media may include computer-readable instructions, program modules, or other data transmitted within a data signal, such as a carrier wave, or other transmission. However, as used herein, computer-readable storage media does not include computer-readable communication media.

In addition to storing computer-executable instructions, the memory 1108 may be configured to store historical sensor profiles. A historical sensor data profile may identify, for a particular set of conditions, configuration settings for operating the sensors of the device 1102 and/or external sensors 1130 (e.g., arm, away, home, etc.). The external sensors 1130 can be or include the detection devices 104. For example, the external sensors 1130 can be or include can be or include cameras, motion sensors, intercoms, security panels, a gas sensor, a heat sensor, a smoke sensor, and/or doorbells. In some examples, the historical sensor data profile may be generated using historical data collected from other users a controlled or uncontrolled environment. Machine-learning techniques may be applied to the historical data to build the profiles. In some examples, the profiles may be user-defined.

The instructions or computer programs may be configured to perform one or more of the operations or functions described with respect to the device 1102. For example, the instructions may be configured to control or coordinate the operation of the various components of the device. Such components include, but are not limited to, display 1110, one or more input/output (I/O) components 1112, one or more communication channels 1114, one or more motion sensors

1116, one or more environmental sensors 1118, one or more bio sensors 1120, a speaker 1122, microphone 1124, a battery 1126, and/or one or more haptic feedback devices 1128.

The display 1110 may be configured to display information via one or more graphical user interfaces and may also function as a input component, e.g., as a touchscreen. Messages relating to the execution of exams may be presented at the display 1110 using the processor units 1106.

The I/O components 1112 may include a touchscreen display, as described, and may also include one or more physical buttons, knobs, and the like disposed at any suitable location with respect to a bezel of the device 1102. In some examples, the I/O components 1112 may be located on an edge of the device 1102.

The communication channels 1114 may include one or more antennas and/or one or more network radios to enable communication between the device 1102 and other electronic devices such as one or more other external sensors 1130, other electronic devices such as a smartphone or tablet, other wearable electronic devices, external computing systems such as a desktop computer or network-connected server. In some examples, the communication channels 1114 may enable the device 1102 to pair with a primary device such as a smartphone. The pairing may be via Bluetooth or Bluetooth Low Energy ("BLE"), near-field communication ("NFC"), or other suitable network protocol, and may enable some persistent data sharing. For example, data from the device 1102 may be streamed and/or shared periodically with the smartphone, and the smartphone may process the data and/or share with a server. In some examples, the device 1102 may be configured to communicate directly with the server via any suitable network, e.g., the Internet, a cellular network, etc.

The sensors of the device 1102 may be generally organized into three categories including motion sensors 1116, environmental sensors 1118, and bio sensors 1120. As described herein, reference to "a sensor" or "sensors" may include one or more sensors from any one and/or more than one of the three categories of sensors. In some examples, the sensors may be implemented as hardware elements and/or in software.

Generally, the motion sensors 1116 may be configured to measure acceleration forces and rotational forces along three axes. Examples of motion sensors include accelerometers, gravity sensors, gyroscopes, rotational vector sensors, significant motion sensors, step counter sensor, Global Positioning System (GPS) sensors, and/or any other suitable sensors. Motion sensors may be useful for monitoring device movement, such as tilt, shake, rotation, or swing. The movement may be a reflection of direct user input, but it can also be a reflection of the physical environment in which the device is sitting. The motion sensors may monitor motion relative to the device's frame of reference or your application's frame of reference. The motion sensors may monitor motion relative to the world's frame of reference. Motion sensors by themselves are not typically used to monitor device position, but they can be used with other sensors, such as the geomagnetic field sensor, to determine a device's position relative to the world's frame of reference. The motion sensors 1116 may return multi-dimensional arrays of sensor values for each event when the sensor is active. For example, during a single sensor event the accelerometer may return acceleration force data for the three coordinate axes, and the gyroscope may return rate of rotation data for the three coordinate axes.

Generally, the environmental sensors 1118 may be configured to measure environmental parameters such as temperature and pressure, illumination, and humidity. The environmental sensors 1118 may also be configured to measure physical position of the device. Examples of environmental sensors 1118 may include barometers, photometers, thermometers, orientation sensors, magnetometers, Global Positioning System (GPS) sensors, and any other suitable sensor. The environmental sensors 1118 may be used to monitor relative ambient humidity, illuminance, ambient pressure, and ambient temperature near the device 1102. In some examples, the environmental sensors 1118 may return a multi-dimensional array of sensor values for each sensor event or may return a single sensor value for each data event. For example, the temperature in ° C. or the pressure in hPa. Also, unlike motion sensors 1116 and bio sensors 1120, which may require high-pass or low-pass filtering, the environmental sensors 1118 may not typically require any data filtering or data processing.

The environmental sensors 1118 may also be useful for determining a device's physical position in the world's frame of reference. For example, a geomagnetic field sensor may be used in combination with an accelerometer to determine the user device's 1102 position relative to the magnetic north pole. These sensors may also be used to determine the user device's 1102 orientation in some of frame of reference (e.g., within a software application). The geomagnetic field sensor and accelerometer may return multi-dimensional arrays of sensor values for each sensor event. For example, the geomagnetic field sensor may provide geomagnetic field strength values for each of the three coordinate axes during a single sensor event. Likewise, the accelerometer sensor may measure the acceleration applied to the device 1102 during a sensor event. The proximity sensor may provide a single value for each sensor event.

Generally, the bio sensors 1120 may be configured to measure biometric signals of a wearer of the device 1102 such as, for example, heartrate, blood oxygen levels, perspiration, skin temperature, etc. Examples of bio sensors 1120 may include a hear rate sensor (e.g., photoplethysmography (PPG) sensor, electrocardiogram (ECG) sensor, electroencephalography (EEG) sensor, etc.), pulse oximeter, moisture sensor, thermometer, and any other suitable sensor. The bio sensors 1120 may return multi-dimensional arrays of sensor values and/or may return single values, depending on the sensor.

The acoustical elements, e.g., the speaker 1122 and the microphone 1124 may share a port in housing of the device 1102 or may include dedicated ports. The speaker 1122 may include drive electronics or circuitry and may be configured to produce an audible sound or acoustic signal in response to a command or input. Similarly, the microphone 1124 may also include drive electronics or circuitry and is configured to receive an audible sound or acoustic signal in response to a command or input. The speaker 1122 and the microphone 1124 may be acoustically coupled to a port or opening in the case that allows acoustic energy to pass, but may prevent the ingress of liquid and other debris.

The battery 1126 may include any suitable device to provide power to the device 1102. In some examples, the battery 1126 may be rechargeable or may be single use. In some examples, the battery 1126 may be configured for contactless (e.g., over the air) charging or near-field charging.

The haptic device 1128 may be configured to provide haptic feedback to a user of the device 1102. For example, alerts, instructions, and the like may be conveyed to the user using the speaker 1122, the display 1110, and/or the haptic device 1128.

The external sensors 1130(1)-1130(*n*) may be any suitable sensor such as the motion sensors 1116, environmental sensors 1118, and/or the bio sensors 1120 embodied in any suitable device. For example, the sensors 1130 may be incorporated into other user devices, which may be single or multi-purpose. For example, a position sensor may be used to determine whether a door or window has been opened, a motion sensor may be used to determine whether there is movement in a space, light sensors, power sensors, liquid detection sensors, and the like may also be used to perform the customary functions. Any of the sensor data obtained from the external sensors 1130 may be used to implement the techniques described herein.

Turning to FIG. 12, an example process 1200 for generating an alarm based on an event is shown. The process 1200 at block 1202 can include receiving, from a first detection device 104*a*, a first set of data associated with an event detected by the first detection device 104*a* in an environment. The first set of data can be received by a security gateway (e.g., security gateway 102). The data can be or include (audio, visual, and/or chemical data). The environment can be an environment associated with a user (e.g., user 202). For example, the environment can be or include the dwelling and/or house of the user 202.

In some examples, the first detection device 104*a* may transmit the first set of data to the security gateway 102 in response to inputting the first set of data into the artificial intelligence model. The artificial intelligence model can output a probability that the event has occurred to the first detection device 104*a* in response to the input. If the probability exceeds a predefined threshold, the first detection device 104*a* can then transmit the first set of data associated with the event to the security gateway 102 based at least in part on the probability.

The process 1200 at block 1204 can include instructing a second detection device 104*b* to detect data for the environment based at least in part on the first set of data. For example, the second detection device 104*b* can be used to detect the same or similar data that was detected by the first detection device 104*a* and/or can be used to detect different data than the data that was detected by the first detection device 104*a*. As an illustrative example, the first detection device 104*a* can detect that there is smoke in the environment and the second detection device 104*b* can confirm that there is smoke and/or detect that there is fire that is causing the smoke. In some examples, before the security gateway 102 instructs the second detection device 104*b* to detect data, the security gateway 102 can input the first set of data into the artificial intelligence model. The artificial intelligence model can output a condition generated in response to the input. The security gateway 102 can determine that further data is needed to determine an alarm status of the event based on the condition.

The process 1200 at block 1206 can include receiving, from the second detection device 104*b*, a second set of data associated with the event. The data can be received by the security gateway 102.

The process 1200 at block 1208 can include determining an alarm status for the event based at least in part on a condition of the event output by an artificial intelligence model. The artificial intelligence model can output the condition in response to receiving an input including the first set of data and the second set of data. The alarm status can be a false alarm event or an alarm event. For example, the condition can indicate or probability the likelihood that a certain event has occurred. If the likelihood or probability exceeds a predefined threshold, the alarm status may be determined to be an alarm event rather than a false alarm event. If the alarm event is determined to be a false alarm event, an alarm indicating the event may not be output.

In some examples, the artificial intelligence model can include a model of user behavior for a user associated with the environment. The user behavior may be detected by the first detection device and the second detection device. The artificial intelligence model may generate the condition by comparing the first set of data and the second set of data to the model of user behavior.

The process 1200 at block 1210 can include outputting an alarm indicating the event based on determining that the alarm status is an alarm event. The alarm can be sent to the user 202 and/or a monitoring station (e.g., monitoring station 204). The alarm can alert the user 202 and/or the monitoring station that the event has occurred. The security gateway 102 can determine a recipient of the alarm based on a type of the event indicated by the condition. For example, if the condition output by the artificial intelligence model indicates a fire event, the security gateway 102 can output the alarm to a local fire station. In some examples, the artificial intelligence model can also be updated using the first set of data and the second set of data in association with the condition to improve the accuracy of the artificial intelligence model.

Examples described herein may take the form of, be incorporated in, or operate with a suitable electronic device such as, for example, a tablet device that may be mounted or secured within a home. The device may have a variety of functions, including, but not limited to: keeping time; monitoring a predefined area may maintaining communication with a plurality of onboard and external sensors; communicating (in a wired or wireless fashion) with other electronic devices, which may be different types of devices having different functionalities; providing alerts to a user, which may include audio, haptic, visual, and/or other sensory output, any or all of which may be synchronized with one another; visually depicting data on a display; gathering data from one or more sensors that may be used to initiate, control, or modify operations of the device; determining a location of a touch on a surface of the device and/or an amount of force exerted on the device, and using either or both as input; accepting voice input to control one or more functions; accepting tactile input to control one or more functions; and so on.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computing systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and all three of A and B and C.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense)

so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
receiving, from a first detection device, a first set of data associated with an event detected by the first detection device in an environment;
in response to receiving the first set of data:
instructing a camera to detect data for the environment based at least in part on the first set of data;
subsequent to instructing the camera to detect data, receiving, from the camera, a second set of data associated with the event;
determining an alarm status for the event based at least in part on a condition of the event output by an artificial intelligence model, the artificial intelligence model configured to output the condition responsive to receiving an input comprising the first set of data and the second set of data, the alarm status comprising a false alarm event or an alarm event; and outputting an alarm indicating the event based on determining that the alarm status is the alarm event.

2. The computer-implemented method of claim 1, further comprising:
determining that the alarm status for the event is the false alarm event based at least in part on the condition; and
based on determining that the alarm status for the event is the false alarm event, forgoing outputting the alarm indicating the event.

3. The computer-implemented method of claim 1, further comprising:
determining a recipient of the alarm based on a type of the event indicated by the condition; and
outputting the alarm indicating the event to the recipient.

4. The computer-implemented method of claim 1, wherein the artificial intelligence model comprises a model of user behavior for a user associated with the environment, the user behavior detected by the first detection device and the camera, and wherein the artificial intelligence model is configured to generate the condition by comparing the first set of data and the second set of data to the model of user behavior.

5. The computer-implemented method of claim 1, further comprising:
updating the artificial intelligence model using the first set of data and the second set of data in association with the condition.

6. The computer-implemented method of claim 1, wherein the artificial intelligence model is configured to output a probability that the event has occurred to the first detection device in response to the first detection device inputting the first set of data into the artificial intelligence model, and wherein the first set of data is received from the first detection device responsive to the first detection device detecting the event based at least in part on the probability.

7. The computer-implemented method of claim 1, wherein instructing the camera to detect data occurs responsive to:
inputting the first set of data into the artificial intelligence model; and
determining, based on the condition output by the artificial intelligence model responsive to inputting the first set of data, that further data is needed to determine the alarm status.

8. A system, comprising:
a first detection device configured to detect data in an environment;
a camera configured to detect data in the environment; and
a security gateway comprising a processor and a memory configured to store computer-executable instructions, the processor configured to access the memory and execute the computer-executable instructions to at least:
receive, from the first detection device, a first set of data associated with an event detected by the first detection device in the environment;
in response to receiving the first set of data:
instruct the camera to detect data for the environment based at least in part on the first set of data;
subsequent to instructing the camera to detect data, receive, from the camera, a second set of data associated with the event;
determine an alarm status for the event based at least in part on a condition of the event output by an artificial intelligence model, the artificial intelligence model configured to output the condition responsive to receiving an input comprising the first set of data and the second set of data, the alarm status comprising a false alarm event or an alarm event; and output an alarm indicating the event based on determining that the alarm status is the alarm event.

9. The system of claim 8, wherein the memory is configured to store additional computer-executable instructions, and the processor is configured to execute the additional computer-executable instructions to:

determine that the alarm status for the event is the false alarm event based at least in part on the condition; and based on determining that the alarm status for the event is the false alarm event, forgo generating the alarm indicating the event.

10. The system of claim 8, wherein the instructions are further executable by the processor for causing the processor to:

determine a recipient of the alarm based on a type of the event indicated by the condition; and output the alarm indicating the event to the recipient.

11. The system of claim 8, wherein the artificial intelligence model comprises a model of user behavior for the environment, the user behavior detected by the first detection device and the camera, and wherein the artificial intelligence model is configured to generate the condition by comparing the first set of data and the second set of data to the model of user behavior.

12. The system of claim 8, wherein the memory is configured to store additional computer-executable instructions, and the processor is configured to execute the additional computer-executable instructions to:

update the artificial intelligence model using the first set of data and the second set of data in association with the condition.

13. The system of claim 8, wherein the memory is configured to store additional computer-executable instructions, and the processor is configured to execute the additional computer-executable instructions to instruct the camera to detect data responsive to:

inputting the first set of data into the artificial intelligence model; and determining, based on the condition output by the artificial intelligence model responsive to inputting the first set of data, that further data is needed to determine the alarm status.

14. The system of claim 8, wherein the first detection device comprises at least one of a position sensor, a motion sensor, a light sensor, or a liquid detection sensor.

15. The system of claim 8, wherein in response receiving the first set of data, the security gateway changes a gateway operating state corresponding to a device operating state of the first detection device, the gateway operating state and the device operating state comprising at least one of an arm state, an arm away, or a disarm state.

16. One or more non-transitory computer-readable storage media comprising computer-executable instructions that, when executed by one or more processors of a computer system, cause the computer system to perform operations comprising:

receiving, from a first detection device, a first set of data associated with an event detected by the first detection device in an environment;

in response to receiving the first set of data:

instructing a camera to detect data for the environment based at least in part on the first set of data;

subsequent to instructing the camera to detect data, receiving, from the camera, a second set of data associated with the event;

determining an alarm status for the event based at least in part on a condition of the event output by an artificial intelligence model, the artificial intelligence model configured to output the condition responsive to receiving an input comprising the first set of data and the second set of data, the alarm status comprising a false alarm event or an alarm event; and outputting an alarm indicating the event based on determining that the alarm status is the alarm event.

17. The one or more non-transitory computer-readable storage media of claim 16, further comprising computer-readable instructions that, when executed by the one or more processors, cause the one or more processors to:

determine that the alarm status for the event is the false alarm event based at least in part on the condition; and based on determining that the alarm status for the event is the false alarm event, forgo outputting the alarm indicating the event.

18. The one or more non-transitory computer-readable storage media of claim 16, wherein the artificial intelligence model comprises a model of user behavior for a user associated with the environment, the user behavior detected by the first detection device and the camera, and wherein the artificial intelligence model is configured to generate the condition by comparing the first set of data and the second set of data to the model of user behavior.

19. The one or more non-transitory computer-readable storage media of claim 16, further comprising computer-readable instructions that, when executed by the one or more processors, cause the one or more processors to:

update the artificial intelligence model using the first set of data and the second set of data in association with the condition.

20. The one or more non-transitory computer-readable storage media of claim 16, wherein the artificial intelligence model is configured to output a probability that the event has occurred to the first detection device in response to the first detection device inputting the first set of data into the artificial intelligence model, and wherein the first set of data is received from the first detection device responsive to the first detection device detecting the event based at least in part on the probability.

* * * * *